Patented Oct. 19, 1926.

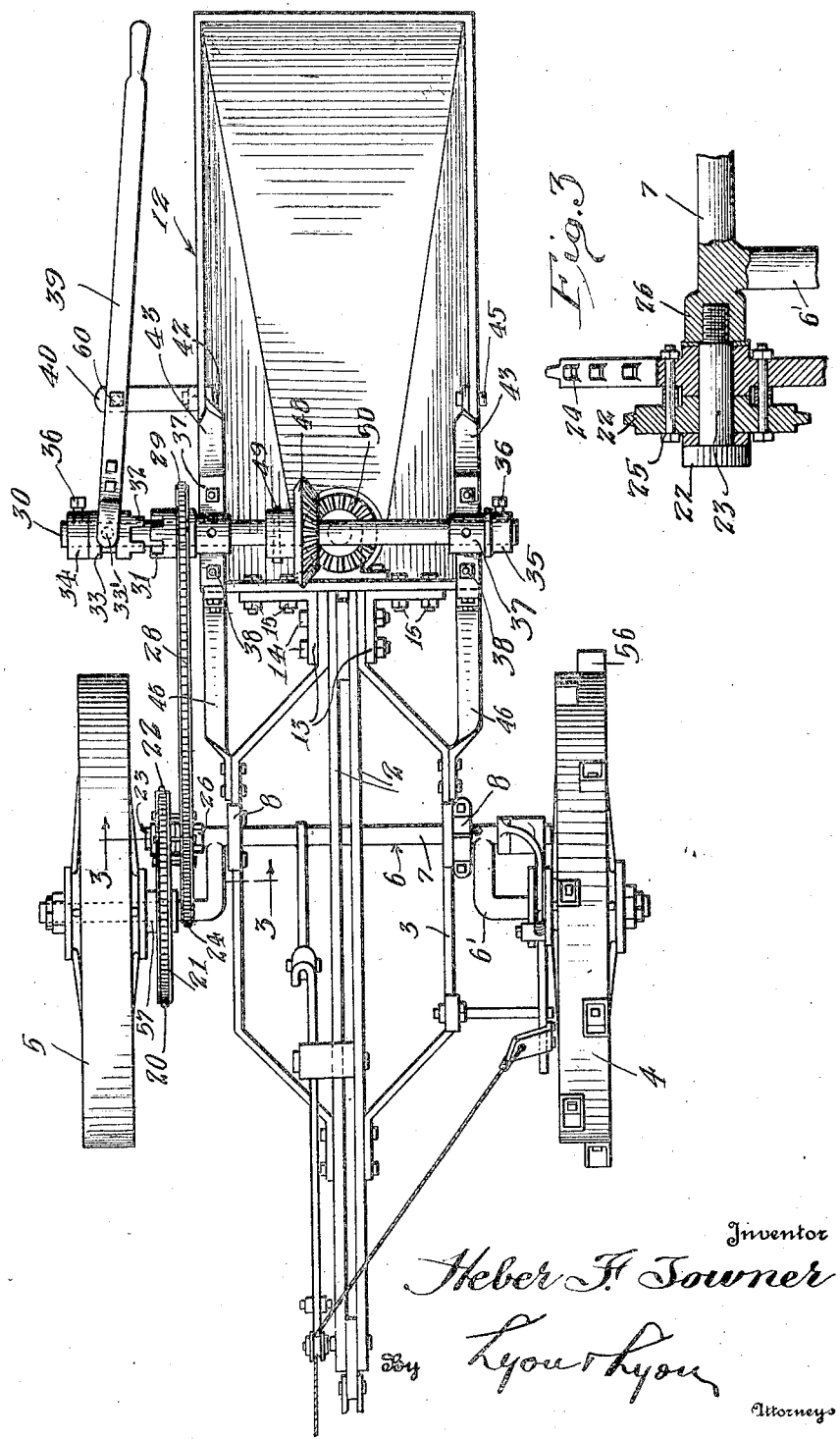

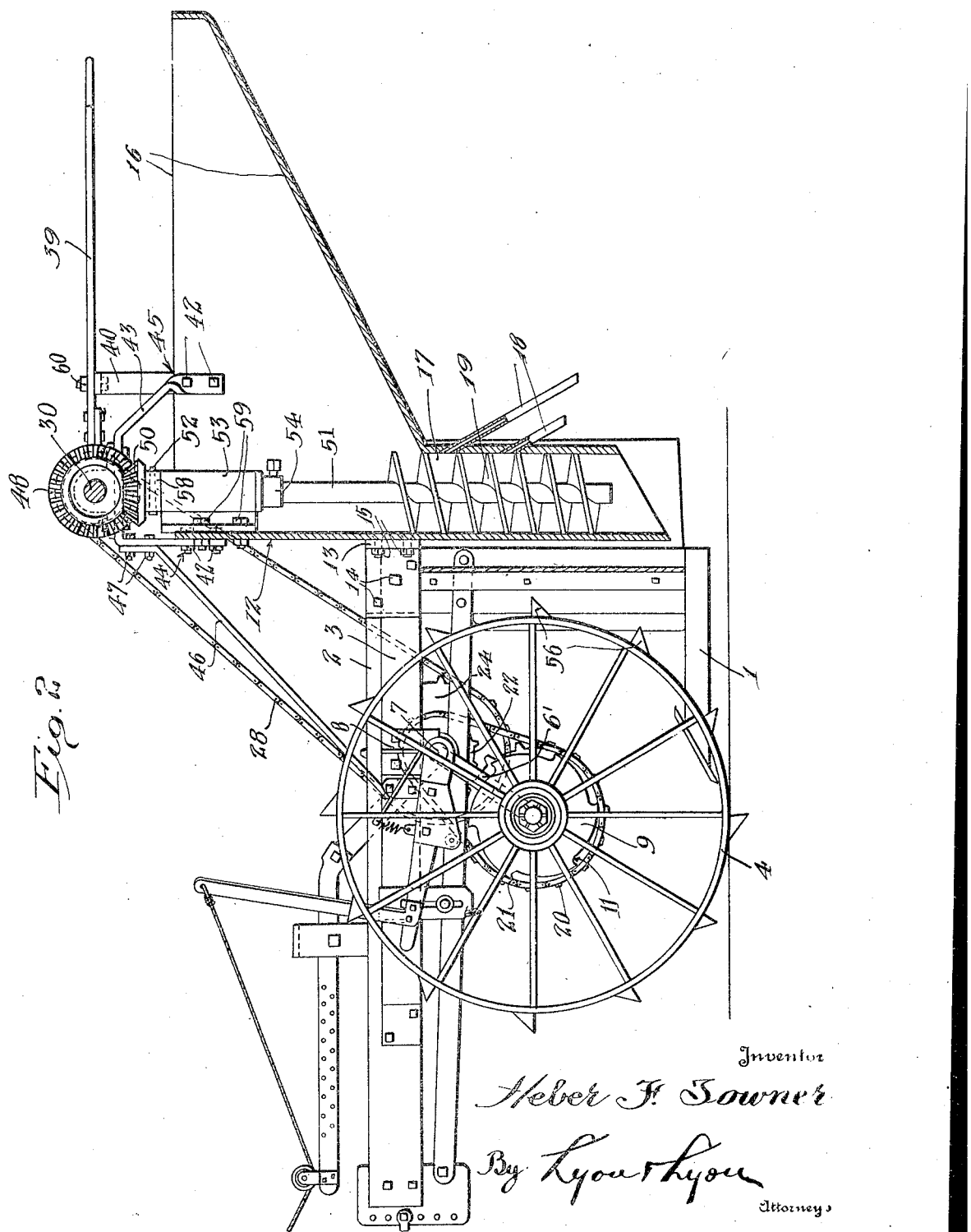

1,603,563

UNITED STATES PATENT OFFICE.

HEBER F. TOWNER, OF SANTA ANA, CALIFORNIA.

FERTILIZING IMPLEMENT.

Application filed November 22, 1923. Serial No. 676,290.

This invention relates to a mechanism for automatically scattering fertilizer through the soil from the surface to the bottom where it keeps the soil from running together or forming what is called "pan."

In certain soils containing a large amount of clay the growth of vegetation is very limited by the formation of "hard pan" which the roots of plants or trees are not able to penetrate; water applied to this soil forms in globules and dries from the surface substantially without penetrating the said surface leaving a baked surface of clay. The object of this invention is to scatter through this soil a fertilizer which is hydroscopic and porous, which keeps this soil from packing, and moist below the surface at all times; whereby the roots are free to go into the soil deeper for moisture and the plant food therein positioned in the soil.

An object of this invention is to provide a mechanism whereby the scattering of the fertilizer is uniform throughout a field of such soil.

An object of this invention is to provide a mechanism whereby the amount of fertilizer supplied to the soil may be easily and efficiently controlled.

An object of this invention is to provide a fertilizer distributing device which is operated by the draft of the device.

An object of this invention is to provide a fertilizer scattering mechanism which will stop the working of the soil should an obstruction present in the fertilizer stop the scattering thereof.

Other objects and advantages of this invention will be evident from the following detailed description of the accompanying drawings which illustrate a preferred embodiment of the invention.

Of the drawings—

Figure 1 is a plan view of an implement embodying the invention,

Figure 2 is a side elevation, part in section,

Figure 3 is a section on the line 3—3 of Fig. 1.

In the drawing the invention is illustrated as incorporated with a subsoil plow but it is obvious that it could be incorporated with other types of ground working implement or separately without incorporation therewith.

In the present instance the subsoil plow 1 is dependently supported on the rear end of a frame comprising two medial parallel beams 2 and two outer beams 3, the beams 2 and 3 being secured together at their terminal ends and the medial portions of the beams 3 being bowed transversely as shown in Figure 2. Ground wheels 4 and 5 are journaled on necks of a crank shaft 6, the same being connected by crank arms 6' with the medial crank pin portion 7 of said shaft which is journaled in bearing blocks 8 secured to the medial portions of the respective beams 3 of the frame.

On the ground wheel 4 is rigidly secured ratchet wheel 9 having teeth 11, one ground wheel 4 to operate the power lift and the other power wheel 5 to be adapted to operate the fertilizer scattering mechanism, also said ground wheel 5 to be adapted to act as a power lift wheel should the fertilizer scattering mechanism become clogged.

The forward pull or normal draft of a tractor is preferably utilized to effect the lifting of the plow frame to remove the subsoil plow 1 from the soil and likewise to lower the same into the soil again, as is fully described and claimed in my copending application filed November 22, 1923, Serial No. 676,289.

The frame 12 of the fertilizer mechanism is secured to the frame members 2 and 3 of the subsoil plow by means of the angle plates 13 and bolts 14, said angle plates 13 being secured to the frame 12 by means of the bolts 15, this method of securing the fertilizer scattering mechanism to the frame members 2 and 3 of the subsoil plow enable the said mechanism to be easily detached therefrom and adapted to any other form of implement. The frame 12 of the fertilizer attachment forms a hopper for the fertilizer. The hopper has an inclined bottom which causes the fertilizer to be fed into the screw chamber 17 thereof with which screw chamber pipes 18 communicate. The screw 19 is adapted to fit closely in the screw chamber 17 and is driven from one of the ground wheels of the subsoil plow as will hereinafter be described.

On the crank shaft 6 is a sprocket wheel 20 which is caused to rotate with the power wheel 5 by means of the rigid connecting collar 57, said sprocket 20 drives a chain 21 to the sprocket wheel 22 which is loosely carried on the bolt shaft 23 and securely bolted to the sprocket wheel 24 by means of the bolts 25.

The bolt shaft 23 is screwed into the nut 26 which is welded to the crank axle portion 7 at its end. On the bolt shaft 23 is the bolt head 27 by means of which the shaft 23 may be removed and the sprocket wheels 22 and 24 changed by removing the bolts 25, as clearly shown in Figure 3 of the drawings. This arrangement of parts permits the easy control of the speed of rotation of the screw 19 and thereby controls the amount of fertilizer scattered through the soil.

The sprocket wheel 24 drives the chain 28 which drives the sprocket wheel 29 which is loosely held on the shaft 30. The collar of the sprocket wheel 29 has teeth 31 which are adapted to be meshed with the teeth 32 of clutch collar 33 which slides on one end of a feathered shaft 30 and is limited by collar 34 which is secured to the shaft by means of a set screw 36. To hold the shaft 30 in position there are provided the collars 34 and 35 which are secured to the shaft 30 by means of set screws 36.

The shaft 30 is journaled to the support 43 by means of spaced bearing 37 which are secured to the supports 43 as shown at 38. The supports 43 are secured to the frame 12 at 44 and 45 by bolts 42. Braces 46 hold the device in position said braces being secured to the frame 12 as shown at 47 and to the frame members 3 of the subsoil plow.

A lever 39 is pivoted to the clutch collar 33 at 33' and fulcrumed on the arm at the pivotal connection 60. Arm 40 is secured to the frame 12 by the bolts 42.

When the lever 39 is thrown outward from the hopper the clutch 33 meshes with the teeth 31 of sprocket wheel 29 and the shaft 30 is caused to rotate which causes the beveled gear 48 which is secured to the shaft 30 by the key 49 to rotate. The beveled gear 48 meshes with the beveled gear 50 which is secured to shaft 51 by the key 52 and rotates the same in the bearing 53 said bearing being secured to the frame 12 as shown at 59 which causes the screw 19 to rotate and feed the fertilizer from the hopper. The collar 54 secured to the shaft 51 together with the spacer collar 58 holds the beveled gears 48 and 50 in mesh.

To further illustrate this invention, suppose a rock should stop the screw 19 by becoming wedged between the frame 12 and the screw 19, the beveled gear 50 is then stopped which stops the beveled gear 48 which tends to stop the travel of the chain 28 which causes the chain axle 6 to be rotated and thereby raise the subsoil plow 1 out of the ground, thereby giving warning to the driver of the tractor who stops the same. The ground wheel 5 is not supplied with ground gripping angle irons 56 as is the ground wheel 4 because when the screw 19 has been stopped and the subsoil plow 1 elevated, it is desirable to have the wheel 5 slide on the ground and not be forced to rotate and break the screw 19 or some other part such as the chains 21 or 28.

The mechanism as herein described, while well adapted to for the purposes stated is susceptible to various modifications and changes without departing from the spirit of the invention, where it is to be understood that such modifications and changes are to be included in the scope of the following claims:

I claim:

In combination with a fertilizer implement including ground wheels, a ground working tool, a power lift for lifting said tool from the ground, a fertilizer container having an outlet, means driven by one of said wheels for conveying fertilizer to said outlet, and emergency mechanism operated by clogging of the conveyor for automatically actuating the power lift mechanism to lift the ground working tool from the ground.

Signed at Los Angeles, California, this 14th day of November, 1923.

HEBER F. TOWNER.